(12) United States Patent
Senecot et al.

(10) Patent No.: US 11,937,619 B2
(45) Date of Patent: Mar. 26, 2024

(54) PEA ALBUMINS, METHOD FOR OBTAINING SAME AND APPLICATIONS THEREOF

(71) Applicant: ROQUETTE FRERES, Lestrem (FR)

(72) Inventors: Ludovic Senecot, Libercourt (FR); Aline Lecocq, Mouvaux (FR); Manuel Barata, Maisnil les Ruitz (FR)

(73) Assignee: Roquette Freres, Lestrem (FR)

( * ) Notice: Subject to any disclaimer, the term of this patent is extended or adjusted under 35 U.S.C. 154(b) by 1074 days.

(21) Appl. No.: 16/606,853

(22) PCT Filed: Apr. 27, 2018

(86) PCT No.: PCT/FR2018/051076
§ 371 (c)(1),
(2) Date: Oct. 21, 2019

(87) PCT Pub. No.: WO2018/197822
PCT Pub. Date: Nov. 1, 2018

(65) Prior Publication Data
US 2022/0400700 A1    Dec. 22, 2022

(30) Foreign Application Priority Data
Apr. 28, 2017 (FR) .................. 17 53765

(51) Int. Cl.
| A23J 1/14 | (2006.01) |
| A23J 3/14 | (2006.01) |
| A23L 29/10 | (2016.01) |
| A23L 33/185 | (2016.01) |

(52) U.S. Cl.
CPC . *A23J 1/14* (2013.01); *A23J 3/14* (2013.01); *A23L 29/10* (2016.08); *A23L 33/185* (2016.08)

(58) Field of Classification Search
CPC .............. A23J 1/14; A23J 3/14; A23L 33/185
USPC ...................................... 426/656
See application file for complete search history.

(56) References Cited

U.S. PATENT DOCUMENTS

| 4,091,120 A | 5/1978 | Goodnight, Jr. et al. |
| 4,734,287 A | 3/1988 | Singer et al. |
| 7,186,807 B2 | 3/2007 | Freres |
| 11,377,472 B2 | 7/2022 | Freres |
| 2008/0226810 A1 | 9/2008 | Freres |
| 2011/0305740 A1 | 12/2011 | Boursier et al. |
| 2014/0296162 A1 | 10/2014 | Van Der Zande et al. |
| 2015/0237885 A1 | 8/2015 | Freres |
| 2015/0368293 A1 | 12/2015 | Freres |

FOREIGN PATENT DOCUMENTS

| CN | 104206644 A | 12/2014 |
| FR | 2 701 847 A1 | 9/1994 |
| JP | 2000069914 | * 3/2000 |
| JP | 2000069914 A | 3/2000 |
| WO | 03053158 A2 | 7/2003 |
| WO | 2006052003 A1 | 5/2006 |
| WO | 2012135774 A2 | 10/2012 |
| WO | 2012162068 A2 | 11/2012 |
| WO | 2014118449 A2 | 8/2014 |

OTHER PUBLICATIONS

FR-270847-Machine Translation. (Year: 1994).*
FR-3001362-Machine Translation. (Year: 2014).*
JP-07-022497-Machine Translaiton. (Year: 1995).*
JP-2000069914-English Abstract (Year: 2000).*
The English translation of the Japanese Office Action, dated Feb. 22, 2022, in the related Japanese Patent Application No. 2019-556646.
Chilean Search Report, dated Aug. 5, 2021, in the related Chilean Appl. No. 201903039.
Sherman, "A critique of some methods proposed for evaluating the emulsifying capacity and emulsion stabilizing performance of vegetable proteins," Italian Journal of Food science., Jan. 1, 1995, 12(1):3-10.
Colombia Office Action, dated Jul. 23, 2021, in the related Colombia Appl. No. 2019/0011847.
The English translation of the International Search Report, dated Jun. 29, 2018, in the corresponding PCT Appl. No. PCT/FR2018/051076.
Quillien L et al: "Foaming and emulsifying properties of pea albumin fractions and partial characterisation of surface-active components", Journal of the Science of Food and Agriculture, Wiley & Sons, Chichester, GB, vol. 80, No. 13, Oct. 1, 2000 (Oct. 1, 2000), pp. 1964-1972.
Lei (Leigh) Gao et al: "Pilot Scale Recovery of Proteins from a Pea Whey Discharge by Ultrafiltration", LWT—Food Science and Technology, vol. 34, No. 3, May 1, 2001 (May 1, 2001), pp. 149-158, XP055076942, ISSN: 0023-6438, DOI: 10.1006/fstl.2000.0743, p. 149-p. 151.
The English translation of the Chinese Office Action, dated Aug. 22, 2022, in the related Chinese Patent Application No. 201880027055.8.

* cited by examiner

*Primary Examiner* — Hamid R Badr

(57) ABSTRACT

The present invention relates to a pea albumin characterized in that its emulsifying activity is improved as it can emulsify more than 600 ml of corn oil per gram of albumin. The invention also relates to a method for obtaining the pea albumin according to the invention. It finally relates to the use of the pea albumin according to the invention in industrial, in particular food and pharmaceutical applications.

15 Claims, No Drawings

PEA ALBUMINS, METHOD FOR OBTAINING SAME AND APPLICATIONS THEREOF

This application is a National Stage Application of PCT/FR2018/051076 filed Apr. 27, 2018, which claims priority from French Patent Application No. 17 53765, filed on Apr. 28, 2017. The priority of said PCT and French Patent Application are claimed. Each of the prior mentioned applications is hereby incorporated by reference herein in its entirety.

The present invention relates to a pea albumin characterized in that its emulsifying activity is improved because it can emulsify more than 600 ml of corn oil per gram of albumin. It also relates to a process for obtaining said pea albumin according to the invention. Finally, it relates to the use of said pea albumin according to the invention in industrial applications, in particular food, cosmetic and pharmaceutical applications.

Since the 1970s, the pea has been the leguminous seed plant that has been the most widely developed in Europe and mainly in France, particularly as a protein resource for animal feed but also for food for human consumption. The pea contains approximately 27% by weight of protein matter. The term "pea" is considered here in its broadest sense and includes in particular all wild-type varieties of "smooth pea", and all mutant varieties of "smooth pea" and of "wrinkled pea", irrespective of the uses for which said varieties are generally intended: food for human consumption, animal feed and/or other uses.

Among the constituents of the pea, those currently most exploited are starch, fibers and proteins, also referred to as noble constituents. The corresponding exploitation process consists in initially producing a suspension of flour, by mixing pea flour and water in a kneader. After having extracted the starch and fibers from this mixture by centrifugation, a protein-rich fraction or light fraction is available. From this fraction, the isolates are obtained by selective precipitation of the proteins at their isoelectric pH; the objective being to insolubilize a protein of interest rich in globulins. A separation operation is then carried out on this suspension of flour, or "milk", in particular by thermocoagulation, the objective of which is to insolubilize a protein of interest consisting of globulins. At this stage of the process, it is necessary to perform a separation in particular by centrifugal decanting, so as to isolate the composition very rich in globulins, also called "floc". The supernatant constitutes what a person skilled in the art generally refers to as "soluble fractions".

It should first of all be specified that the term "soluble fractions" constitutes an abuse of language in that said fraction contains a certain number of insoluble particles, such as various and varied colloids but also and especially proteins. These soluble fractions must first of all be concentrated by evaporation, so that the insoluble compounds, and especially the proteins, that they contain can be recovered. At the current time, the soluble fractions are exploited very little; they are used almost exclusively as a source of nitrogen in fermentation and as a nutritive feed for livestock once said fractions have been enriched with fibers.

As it happens, it must be noted that the yield of the overall process leading from the initial pea to the composition rich in globulins, the floc, is far from reaching 100%. It is estimated that, at an industrial level, within soluble fractions there are found between 5% and 25%, but more generally around 20%, by weight of the proteins initially contained in the starting pea.

Several works have been carried out in order to recover this protein fraction, mainly of albumin type, present in this soluble fraction. The document "Pilot scale recovery of proteins from a pea whey discharge by ultrafiltration" (Lei (Leigh) Gao, Lebensm.-Wiss. u.-Technol., Vol 34, pp. 149-158, 2001) is concerned with recovery of pea albumin by centrifugation followed by ultrafiltration, then neutralization at pH 7 and spray-drying.

Patent application WO 2006/052003 relates in turn to a process for preparing soluble polypeptides derived from a liquid pea transformation effluent, by membrane filtration, followed by neutralization by addition of calcium carbonate and drying.

The applicant has also developed a process described in patent application WO 2014/118449 based on the succession a) of a centrifugation or microfiltration, b) then an ultrafiltration, c) and, finally, optionally a reverse osmosis to recover an albumin-rich fraction.

The emulsifying properties are conventionally evaluated by two indices: the emulsifying activity (EA) and the emulsion stability (ES). (Boye et al. 2010a). The emulsifying activity (EA) is defined by the maximum amount of oil that can be dispersed in an aqueous solution containing a defined amount of emulsifier before breaking or phase inversion of the emulsion (Sherman, 1995).

Milk albumins are known for their high emulsifying activity. Despite the progress made to date, the emulsifying activity of pea albumins is advantageous but remains below those of milk albumin fractions, which remain the reference.

"Pilot scale recovery of proteins from a pea whey discharge by ultrafiltration" (Lei (Leigh) Gao, Lebensm.-Wiss. u.-Technol., vol 34, pp. 149-158, 2001) teaches in its table 3 that the emulsifying activity, or emulsifying capacity, of pea albumin is much lower than that of soy or that of milk: the emulsifying activity therein is less than half that of egg albumin. It is also noted in this article that the foaming capacity, that is to say the propensity of the product to form foam, is for its part excellent, this property which may be advantageous for certain applications goes against the properties sought in the context of the present invention. Indeed, the formation of foam can be problematic when these compounds must be subjected to a membrane filtration step, an addition of chemical antifoam then having to be carried out. Because of this lower emulsifying activity, pea albumins can not completely replace milk proteins, and especially milk albumins, in several food applications such as cold cuts or coffee whiteners or even certain pharmaceutical or cosmetic applications. Several approaches to improve this emulsifying activity have been proposed. "Foaming and emulsifying properties of pea albumin fractions and partial characterization of surface-active components" (Lu et al., J. Sci. Food. Agric., 80: 1964-1972, 2000) teaches that the emulsifying properties of pea albumin are maximal at acid pH and that it would be necessary to carry out a complex fractionation process in order to access a sub-fraction called Pa2 for improving the emulsifying properties of pea albumins. Other complex and expensive strategies involve, for example, enzymatic hydrolysis or chemical modifications. These approaches nevertheless remain complicated and expensive.

To its credit, the applicant has known how to isolate a pea albumin with improved emulsifying activity, has designed a simple process for obtaining it and has developed food, cosmetic and pharmaceutical applications with said improved pea albumin that were until now impossible to implement with the previous known plant albumins.

A first subject of the present invention therefore consists of a pea albumin characterized in that its emulsifying activity is greater than 600 ml of corn oil per gram of albumin. Preferentially, the emulsifying activity will be greater than 800 ml of corn oil per gram of albumin. More preferentially, the emulsifying activity will be greater than 1000 ml of corn oil per gram of albumin.

In the present application, the term "pea albumin" is intended to mean the water-soluble protein fraction extracted during the process of aqueous fractionation of the various constituents of the pea (see for example the patent EP 1 400 537 of the applicant).

The emulsifying activity is defined as the maximum amount of oil that can be dispersed in an aqueous solution containing a defined amount of emulsifier before breaking or phase inversion of the emulsion (Sherman, 1995). In order to quantify it, the applicant has developed a test that makes it possible to quantify it easily, quickly and reproducibly. This process consists in carrying out the following steps:

1. 0.2 g of the product sample is dispersed in 20 ml of water.
2. The solution is homogenized with an Ultraturax IKA T25 device for 30 sec at a speed of 9500 revolutions per minute (rpm).
3. Addition of 20 ml of corn oil sold under the name Amphora by the company Cargill under homogenization under the same conditions as the previous step 2.
4. Centrifugation for 5 minutes at 3100 g.
   a. If a good emulsion is obtained, that is to say without breaking or phase inversion of the emulsion, the test is started again from step 1 with the amounts of water and corn oil being increased by 50%.
   b. If a bad emulsion is obtained, for example phase separation, breaking or phase inversion of the emulsion, the test is started again from step 1 with the amounts of water and corn oil being decreased by 50%.

The maximum amount of oil (Qmax in ml) that can be emulsified is thus determined iteratively. The emulsifying activity is therefore the maximum amount of corn oil that can be emulsified per gram of product.

Emulsifying activity=($Q$ max/0.2)×100

A second subject of the present invention consists of a process for treating a pea soluble fraction which makes it possible to obtain a pea albumin, comprising:
a. The provision of a pea soluble fraction,
b. Followed by a step of vacuum degassing of the pea soluble fraction,
c. Followed by a step of microfiltration or centrifugation of the degassed soluble fraction leading to a microfiltration permeate or a centrifugation supernatant,
d. Followed by a step of ultrafiltration of the preceding microfiltration permeate or preceding centrifugation supernatant, leading to an ultrafiltration retentate,
e. Followed by an optional step of reverse osmosis of the ultrafiltration permeate leading to a permeate, and a retentate resulting from the reverse osmosis,
f. Followed by neutralization of the pH of the retentates obtained during step d) or e),
g. Followed by a UHT heat treatment of the neutralized retentate of step f),
h. Followed by drying the heat-treated retentate of step g).

The first step therefore consists of the provision of a pea soluble fraction. The term "pea soluble fraction" is intended to mean the residual solution obtained after extraction of starch, internal fibers and globulins from an aqueous milk of pea flour (see for example the patent EP 1 400 537 of the applicant).

The second step therefore consists of a vacuum degassing step. The aim here is to rid the pea soluble fraction of its dissolved gases by vacuum treatment. A suitable device may be for example the SPX Derox skid. The soluble fraction is subjected to an inlet temperature which is for example between 45° C. and 55° C., preferably around 50° C., and to low pressure conditions. The "vacuum" applied corresponds for example to a pressure between 0.05 bar and 0.15 bar, preferentially around 0.1 bar. This step makes it possible to dispense with the addition of antifoam conventionally carried out, which degrades the functional properties of the albumin.

The third step of the process according to the invention is a microfiltration or centrifugation step which takes place directly on the degassed pea soluble fractions, as derived from the previous step. This step has in particular the objective of isolating an albumin-rich protein fraction.

When the third step is a centrifugation, a person skilled in the art can use any piece of equipment for separating using centrifugal force, such as a centrifuge, a horizontal decanter, a plate centrifuge or a desludger disk centrifuge.

When the third step is a microfiltration, it is preferably a tangential membrane microfiltration. More particularly, the tangential microfiltration is preferably carried out with ceramic membranes having a porosity of 0.01 µm to 1 µm, preferably of 0.05 µm to 0.5 µm.

Optionally, this microfiltration or centrifugation step can be preceded by a step of flocculation of the insoluble particles contained in the soluble fraction of starch plants, by any technique known moreover to a person skilled in the art.

The fourth step of the process according to the invention consists of a step d) of ultrafiltration, carried out on the microfiltration permeate or on the centrifugation supernatant. It makes it possible to obtain, on the one hand, an ultrafiltration retentate rich in albumins and, on the other hand, an ultrafiltration permeate rich in sugars and in salts. Optionally, it is possible to add, upstream of this ultrafiltration step, an optional concentration step making it possible to reduce the amount of water and to facilitate the ultrafiltration step. To this end, a person skilled in the art may for example use an evaporator or else a reverse osmosis.

More particularly, it is recommended to carry out the ultrafiltration with membranes having a cutoff threshold of between 5 and 20 kiloDaltons (KDa), preferably 5 or 10 KDa, the transmembrane pressure being maintained below 4 bar.

The process according to the present invention may then comprise an optional fifth step: it is a reverse osmosis carried out on the ultrafiltration permeate. The applicant recommends carrying out this osmosis with membranes having a sodium chloride rejection rate of between 97 and 99.9% of sodium chloride rejection rate.

The sixth step consists of the neutralization of the retentate of the preceding step by adding a base with stirring. Preferentially, the pH of the retentate is adjusted to a between 6 and 8. More preferentially, the pH of the retentate is adjusted to between 6.5 and 7.5. Preferentially, the base used is selected from sodium hydroxide, potassium hydroxide or aqueous ammonia. More preferentially, the base used is sodium hydroxide. It should be noted that the use of carbonate is to be avoided since it has a detrimental action on the taste of the albumin fraction obtained.

The seventh step consists of a UHT heat treatment of the previous neutralized retentate. The treatment temperature is between 130° C. and 150° C., preferentially 140° C. The treatment time is between 5 and 15 seconds, preferentially 10 seconds.

The eighth step is the final drying of the retentate by any technique known to a person skilled in the art. Preferentially, a single-stage spray-dryer will be used.

The third and final subject of the present invention consists of the use of said pea albumin in order to emulsify a large amount of oil in non-dairy coffee-whitener type food applications, in particular where milk proteins are completely replaced, UHT drinks rich in proteins and lipids intended for clinical nutrition, especially with total or partial replacement of milk proteins, or ice cream, especially with total or partial replacement of milk proteins. The albumin according to the present invention also makes it possible to envision applications in the pharmaceutical and cosmetic field.

The examples which follow make it possible to better illustrate the application, without however limiting the scope thereof.

EXAMPLES

Example 1

This example illustrates the production of a pea albumin according to the prior art WO 2014/118449, that will be called PA.

The first step is to obtain the pea soluble fraction. Pea flour is initially prepared by grinding shelled fodder peas on an Alpine hammer mill equipped with a 100 pm grid. 300 kg of flour with a dry matter content of 87% are then soaked in water at the final concentration of 25% on a dry basis, at a pH of 6.5. 1044 kg of flour suspension with a dry matter content of 25%, i.e. therefore 261 kg of dry flour, are then introduced with 500 kg of water into a 14-stage hydrocyclone battery. It is fed with the flour suspension at stage No. 5. This separation leads to the obtaining of a light phase which corresponds to the output of stage No. 1. It consists of the mixture of proteins, internal fibers and soluble matter.

This light phase at the outlet of the hydrocyclones contains as a mixture, 142 kg on a dry basis in total: the fibers, approximately 14.8% by weight, i.e. 21 kg on a dry basis; the proteins; approximately 42.8% by weight, i.e. 60.8 kg on a dry basis; and the soluble matter, approximately 42.4% by weight, i.e. 60.2 kg on a dry basis. This fraction has a dry matter content of 11.4%. The fibers are separated on centrifugal decanters of Westfalia type used in an industrial potato starch processing unit. The light phase at the outlet of the centrifugal decanter contains a mixture of proteins and soluble matter, while the heavy phase contains the pea fibers. The heavy phase contains 105 kg of fibers with a 20% dry matter content. It is noted that virtually all of the fibers are indeed found in this fraction.

As for the fraction of proteins and soluble matter, it contains 1142 kg of a solution mixture of soluble matter and proteins (fraction with a 6% dry matter content). The proteins are flocculated at their isoelectric point by adjusting the light phase at the outlet of the centrifugal decanter to a pH of 4.5 and heating at 50° C.

The proteins thus flocculated are left for 10 minutes in the maturation tank. After precipitation of the proteins, centrifugal decanting is carried out, which makes it possible to recover, after drying, sediment containing 56 kg of globulin-type proteins (86% of Nx6.25 on a dry basis) with a dry matter content of 93%, and a soluble fraction containing albumins, sugars and salts, containing 2.5 g per 100 g with respect to solids, of which 27% is proteins.

Then, this pea soluble fraction is pumped through a microfiltration unit equipped with ceramic membranes of Inside Ceram® type having a porosity of 0.14 µm (19 channels of 4.5 mm). Throughout the filtration, the temperature is regulated at 60° C. and the transmembrane pressure is maintained at a value between 0.4 and 0.6 bar. 707 liters of microfiltration permeate, containing 2.5 g/100 g of solids and 1768 liters of microfiltration retentate, containing 2.5 g/100 g of solids are thus recovered.

550 liters of the microfiltration permeate are pumped through an ultrafiltration unit. The ultrafiltration unit is equipped with ceramic membranes of Kerasep® BX type sold by the company Novasep and having a cutoff threshold of 15 KDa (7 channels of 6 mm). Throughout the filtration, the temperature is regulated at 60° C. and the transmembrane pressure is maintained at a value between 1 and 3 bar.

467 liters of ultrafiltration permeate, containing 2.2 g/100 g of solids, and 33 liters of retentate are thus recovered. The PA ultrafiltration retentate is spray-dried on a spray-drying tower of single-stage spray-dryer type. The inlet temperature setpoint is 190° C. and the outlet temperature is between 85 and 90° C.

The composition of the final albumin fraction (spray-dried PA ultrafiltration retentate) is given in the table below:

| | | |
|---|---|---|
| Dry matter content | 93.9 | % |
| Protein content (N × 6.25) | 97 | g/100 g of dry matter content |
| Ash content | 0.1 | g/100 g of dry matter content |

Example 2

This example illustrates the production of a pea albumin according to the invention, which we will call PA_INV.

The process is similar until the obtaining of the pea soluble fraction according to the steps described in the first paragraph of example 1.

The pea soluble fraction thus obtained is first degassed by passing over an SPX Derox skid. The controlling parameters of said SPX Derox skid are as follows:

| | | |
|---|---|---|
| Supply pressure | bar | 0.88 |
| Outlet pressure | bar | 2.73 |
| T° C. supply | ° C. | 50.5 |
| T° C. outlet | ° C. | 42.8 |
| T° C. condenser | ° C. | 37 |
| Vacuum setpoint | bar | 0.1 |
| Tank level setpoint | % | 60 |
| Flow rate of withdrawal to NA7 | L/H | 750 |
| Inlet dissolved $O_2$ | mg/L | 9 |
| Outlet dissolved $O_2$ | mg/L | 0.1 |

Correct degassing is verified by measuring the dissolved oxygen at the inlet and at the outlet.

Then, this degassed pea soluble fraction is pumped through a microfiltration unit equipped with ceramic membranes of Inside Ceram® type having a porosity of 0.14 µm (19 channels of 4.5 mm). Throughout the filtration, the temperature is regulated at 60° C. and the transmembrane pressure is maintained at a value between 0.4 and 0.6 bar.

The permeate is pumped through an ultrafiltration unit. The ultrafiltration unit is equipped with ceramic membranes of Kerasep® BX type sold by the company Novasep and having a cutoff threshold of 15 KDa (7 channels of 6 mm)

Throughout the filtration, the temperature is regulated at 60° C. and the transmembrane pressure is maintained at a value between 1 and 3 bar.

The succession of 3 diafiltrations is carried out, consisting of the repetition, 3 times, of an addition of a volume of potabilized decarbonated water to a volume of retentate followed by ultrafiltration until a dry matter content of the permeate of less than 0.5% is obtained.

The ultrafiltration retentate obtained is then corrected, with stirring, to pH 6.8 by adding concentrated sodium hydroxide at 50%.

A UHT heat treatment is then applied to the neutralized ultrafiltration retentate, consisting in passing over a Vomatec skid, at a temperature of 140° C. for a contact time of about ten seconds and then flashed under vacuum at approximately 90° C.

The solution obtained at the outlet of the UHT heat treatment is finally spray-dried on a spray-drying tower of single-stage spray-dryer type. The inlet temperature setpoint is 190° C. and the outlet temperature is between 85 and 90° C.

The pea albumin powder obtained is called PA_INV. The composition thereof is given in the table below:

| | | |
|---|---|---|
| Dry matter content | 94.4 | % |
| Protein content (N × 6.25) | 94 | g/100 g of dry matter content |
| Ash content | 2.5 | g/100 g of dry matter content |

Example 3

This example aims to describe the protocol used to measure the emulsifying activity (EA) of the pea albumins obtained previously in examples 1 (according to the prior art) and 2 (according to the invention):

1. 0.2 g of the product sample is dispersed in 20 ml of water.
2. The solution is homogenized with an Ultraturax IKA T25 device for 30 sec at a speed of 9500 revolutions per minute (rpm).
3. Addition of 20 ml of corn oil sold under the name Amphora by the company Cargill under homogenization under the same conditions as the previous step 2.
4. Centrifugation for 5 minutes at 3100 g.
   a. If a good emulsion is obtained, that is to say without breaking or phase inversion of the emulsion, the test is started again from step 1 with the amounts of water and corn oil being increased by 50%.
   b. If a bad emulsion is obtained, for example phase separation, breaking or phase inversion of the emulsion, the test is started again from step 1 with the amounts of water and corn oil being decreased by 50%.

The maximum amount of oil (Qmax in ml) that can be emulsified is thus determined iteratively.

The emulsifying activity is therefore the maximum amount of corn oil that can be emulsified per gram of product.

$$\text{Emulsifying activity} = (Q\text{ max}/0.2) \times 100$$

Example 4

This example aims to present the comparison of the two pea albumins PA (example 1, according to the prior art) and PA_INV (example 2, according to the invention) and also several albumins, plant and dairy, and reference commercial globulins.

| | | Emulsifying activity (ml of oil/g of product) |
|---|---|---|
| Egg white powder | Egg albumins | 1225 |
| WPC 392 | whey protein concentrate | 1301 |
| Skimmed Milk Powder | skimmed milk powder | 1185 |
| Sodium Caseinate supplier 1 | Sodium caseinate | 782 |
| NUTRALYS S85F | Pea globulins | 786 |
| NUTRALYS S85 PLUS | Pea globulins | 195 |
| PA | Pea albumins according to the prior art | 564 |
| PA_INV | Pea albumins according to the invention | 1314 |

It is clearly seen that, with the albumins according to the invention, emulsifying activity values which are more than double those of the pea albumins of the prior art are successfully achieved. The new values make it possible to envision applications similar to those that are possible with animal proteins such as albumins derived from egg or milk.

Example 5: Use of the Albumins Obtained According to the Invention in Food Applications of the Coffee-Whitener Type This example illustrates the possibilities of food application offered by the pea albumin according to the invention by presenting results for production of "coffee-whitener" (milk substitutes for coffee) aimed at totally replacing the sodium caseinates conventionally used.

The compositions of the various mixtures are given in the table below, as percentage by crude weight of the final composition. In order to prepare them, the following procedure is followed:

Heating coconut oil to 80° C. with stirring and adding Dimodan HP to solubilize the monoglycerides.

Heating 90% of the water to 50° C. and adding the proteins with stirring.

Solubilizing the phosphate salts in the remaining 10% of water.

Adding the solution of the phosphate salts and the glucose syrup to the container containing the aqueous solution of proteins.

Pre-emulsifying the Dimodan HP/oil solution with a homogenizer for 5 min at 10000 rpm.

Mixing the two solutions in a homogenizer at 160 bar at 75° C. until an emulsified solution is obtained.

Pasteurizing for 5 s at 80° C.

In order to quantify the emulsion quality, the particle size is measured using a Particle Size Analyser 3000 from the company Malvern. Dmode represents the mean size of the emulsified particles.

|  | Control 1 (caseinate) | Control 2 (Pea globulin) | Control 3 (Pea albumin PA) | Pea albumin according to the invention (PA_INV) |
|---|---|---|---|---|
| Glucose syrup 3072 (Roquette) | 45.85 | 45.85 | 45.85 | 45.85 |
| Hydrogenated coconut oil | 23.36 | 23.36 | 23.36 | 23.36 |
| Sodium caseinate EM7 (DMV) | 1.75 | — | — | — |
| Pea globulins (Nutralys S85F) | — | 1.75 | — | — |
| Pea albumins PA | — | — | 1.75 | — |
| Pea albumins PA INV | — | — | — | 1.75 |
| Dipotassium hydrogen phosphate E340 (Merck) | 1.46 | 1.46 | 1.46 | 1.46 |
| Dimodan HP | 0.58 | 0.58 | 0.58 | 0.58 |
| Water | 27 | 27 | 27 | 27 |
| D10 (microns) | 0.256 | 3.83 | 108 | 0.362 |
| D50 (microns) | 0.535 | 8.15 | 2.76 | 1.26 |
| D90 (microns) | 1.16 | 17.7 | 5.14 | 5.02 |
| Dmode (microns) | 0.526 | 8.15 | 2.78 | 0.586 |
| D4,3 (microns) | 0.964 | 11 | 0.586 | 2.1 |

It is clearly seen that only the pea albumin according to the invention PA_INV makes it possible to obtain emulsified particles with a mean size of less than one micron.

Example 6: Use of the Albumins Obtained According to the Invention in Food Applications of UHT Ready-to-Drink (or RTD) Beverage Type, for Dietetic Nutrition, Sports Nutrition or Clinical Nutrition This example illustrates the food application possibilities offered by the pea albumin according to the invention by presenting results for production of UHT ready-to-drink beverages for mainstream nutrition, dietetic nutrition, sports nutrition or clinical nutrition aimed at partially (approximately 50%) replacing the sodium caseinates conventionally used. The example presents compositions containing approximately 10% by weight of proteins, but the pea albumin according to the invention is also suitable for compositions of which the protein content ranges between 5% and 15% by weight, or even 20% by weight. Likewise, higher oil contents are possible; it will be sufficient for a person skilled in the art to adjust the recipe with the pea albumin according to the invention. In the light of the emulsifying properties of the albumins according to the invention, a total replacement of milk proteins can also be envisioned.

The compositions of the various mixtures are given in the table below, as weight percentage of the final composition. In order to prepare them, the following procedure is followed:

- Dry mixing of the powdered products (proteins, maltodextrins and sucrose).
- Heating of the water to 50° C., addition of the previously prepared powder mix, dispersion with a Silverson high-shear mixer for 30 min, at 50° C., at 3500 rpm, addition of the vanilla flavor.
- Placing of the lecithin and the oil in a separate container; stirring and heating to 50° C.
- After 30 minutes of hydration, addition of this lecithin/oil solution to the first mixture (proteins, maltodextrins and sucrose) using a high-shear mixer for 5 minutes (10000 rpm).
- Homogenization at 200 bar and 75° C. in two steps (30% over the course of the second step).
- Performing of a UHT treatment at 142° C. for 5 s.
- Cooling and storing at 4° C.

In order to quantify the emulsion quality, the particle size is measured using a Particle Size Analyzer 3000 from the company Malvern. Dmode represents the mean size of the emulsified particles.

|  |  |  | Control 1 (Caseinate) | Control 2 (Pea globulin) | Control 3 (Pea albumin PA) | Pea albumin according to the invention (PA_INV) |
|---|---|---|---|---|---|---|
| Ingredients | Water |  | 60 | | | |
|  | Maltodextrin | Glucidex ® IT19 (ROQUETTE) | 18.74 | 18.34 | 18.81 | 18.81 |
|  | Rapseed oil |  | 3.78 | | | |
|  | Sucrose |  | 3.4 | | | |
|  | Sunflower oil |  | 5.52 | | | |
|  | Soy lecithin |  | 0.4 | | | |
|  | Vanilla flavor |  | 0.36 | | | |
|  | Milk casein | MPI - Prodiet 85b | 10.8 | 5.53 | 5.53 | 5.53 |
|  | Pea globulin | Nutralys ® S85F | 0 | 5.67 | 0 | 0 |
|  | Pea albumin according to the prior art | PA | 0 | 0 | 5.2 | 5.2 |
|  | Pea albumin according to the invention | PA_INV | 0 | 0 | 0 | 0 |
| Particle size analysis | Dx 10 (micron) |  | 0.186 | 0.565 | 3.31 | 0.203 |
|  | Dx 50 |  | 0.546 | 43.1 | 9.34 | 0.482 |
|  | Dx 90 |  | 1.66 | 105 | 103 | 6.2 |
|  | Dmode |  | 0.577 | 69.1 | 6.19 | 0.444 |
|  | D 4, 3 |  | 3.48 | 47.9 | 35.1 | 3.08 |

It is clearly seen that only the pea albumin according to the invention PA_INV makes it possible to obtain a Dmode as good (less than 1 micron) as the reference obtained with caseins of dairy origin.

Example 7: Use of the Albumins Obtained According to the Invention in Food Applications of "Pea Milk" or "Vegetable Milk" Type, Intended for Daily Consumption This example illustrates the food application possibilities offered by the pea albumin according to the invention by presenting results for production of beverages of "pea milk" or "vegetable milk" type intended for daily consumption.

The compositions of the various mixtures are given in the table below. In order to prepare them, the following procedure is followed:

Mixing the water and the gellan gum in water at 90° C. until completely dissolved, while stirring if necessary. Cooling to 70° C.
Adding the other constituents, with the exception of the oil, sunflower lecithin and vanilla flavor, until completely dissolved, while stirring if necessary.
Heating the sunflower oil and adding the lecithin.
Adding the oil/lecithin mixture and the vanilla flavor with stirring with a high-shear mixer.
Homogenizing the solution at 75° C. using a high-pressure homogenizer at 270 bar (1st step) and 30 bar (2nd step).
Sterilizing by UHT treatment at 142° C. for 5 sec.
Packaging and storing at 4° C.

In order to quantify the emulsion quality, the particle size is measured using a Particle Size Analyzer 3000 from the company Malvern. Dmode represents the mean size of the emulsified particles.

|   |   |   | Control 1 (Pea globulin) | Control 2 (Pea albumin PA) | Pea albumin according to the invention (PA_INV) |
|---|---|---|---|---|---|
| Ingredients | Water | | 87.77 | 87.1 | 87.84 |
| | Sucrose | | 6.3 | 6.3 | 6.3 |
| | Sunflower oil | | 1.6 | 1.6 | 1.6 |
| | Tricalcium phosphate | | 0.29 | 0.29 | 0.29 |
| | Geilan gum | Kelgogel HS-B geilan gum | 0.1 | 0.1 | 0.1 |
| | Sunflower lecithin | Unilec SFL-IP non GMO | 0.1 | 0.1 | 0.1 |
| | Dipotassium hydrogen phosphate | | 0.08 | 0.08 | 0.08 |
| | Cocktail of vitamins | Barentz DB2812 Premix 9309 | 0.02 | 0.02 | 0.02 |
| | Pea globulin | Nutrelys S85F | 3.75 | 0 | 0 |
| | Pea albumin according to the prior art | PA | 0 | 4.42 | 0 |
| | Pea albumin according to the invention | PA_INV | 0 | 0 | 3.68 |
| Particle size analysis | D10 (in microns) | | 0.24 | 2.83 | 0.24 |
| | D50 (in microns) | | 0.61 | 5.58 | 0.59 |
| | D90 (in microns) | | 10.5 | 10.7 | 4.34 |
| | Dmode (in microns) | | 0.43 | 5.85 | 0.44 |
| | D4,3 (in microns) | | 3.37 | 6.23 | 2.11 |

It is clearly seen that only the pea albumin according to the invention PA_INV makes it possible to obtain a Dmode as good (less than 1 micron) as the reference obtained with pea globulin. The pea albumin of the prior art does not make it possible to obtain a Dmode of emulsified globules of less than 1 micron, and similar to the globulin reference: only the pea albumin according to the present invention makes it possible to do so.

The invention claimed is:

1. A pea albumin, wherein said pea albumin has an emulsifying activity greater than 600 ml of corn oil per gram of albumin, wherein the emulsifying activity is defined by the maximum amount of oil that can be dispersed in aqueous solution containing a defined amount of an emulsifier before breaking or phase inversion of an emulsion.

2. The pea albumin as claimed in claim 1, wherein said emulsifying activity is greater than 800 ml of corn oil per gram of albumin.

3. The pea albumin as claimed in claim 2, wherein said emulsifying activity is greater than 1000 ml of corn oil per gram of albumin.

4. A process for treating a pea soluble fraction for obtaining a pea albumin as claimed in claim 1, comprising the steps of:
 a. providing a pea soluble fraction;
 b. vacuum degassing of the pea soluble fraction leading to a degassed soluble fraction;
 c. microfiltering or centrifuging of the degassed soluble fraction leading to a microfiltration permeate or a centrifugation supernatant;
 d. ultrafiltering the microfiltration permeate or centrifugation supernatant, leading to an ultrafiltration retentate;
 e. optionally reverse osmosis of the ultrafiltration permeate, leading to a permeate and a retentate resulting from the reverse osmosis;
 f. neutralizing the pH of the retentates obtained during step d) or e);
 g. UHT heat treating of the neutralized retentate of step f) leading to a heat-treated retentate; and
 h. drying the heat-treated retentate of step g).

5. The process as claimed in claim 4, wherein the neutralization pH of step f) is between 6.5 and 7.5.

6. The process as claimed in claim 4, wherein step f) is carried out by adding a base selected from the group consisting of sodium hydroxide, potassium hydroxide and aqueous ammonia.

7. The process as claimed in claim 4, wherein the heat treatment of step g) is carried out at a temperature of between 130° C. and 150° C. for a treatment time of between 5 and 15 seconds.

8. The process as claimed in claim 4, wherein the drying of step h) is carried out by single-stage spray-drying.

9. A food formulation, comprising the pea albumin according to claim 1.

10. A coffee whitener, comprising the pea albumin according to claim 1.

11. A ready-to-drink beverage, comprising the pea albumin according to claim 1.

12. A pharmaceutical formulation, comprising the pea albumin according to claim 1.

13. The process as claimed in claim 6, wherein said base is sodium hydroxide.

14. The process as claimed in claim 4, wherein the heat treatment of step g) is carried out at a temperature of 140° C.

15. The process as claimed in claim 4, wherein the treatment time is about 10 seconds.

* * * * *